May 14, 1946.　　　　D. IMMERMAN　　　　2,400,149
VISUAL AID DEVICE FOR RELATIVE MOVEMENT
Filed June 21, 1944　　　3 Sheets-Sheet 1
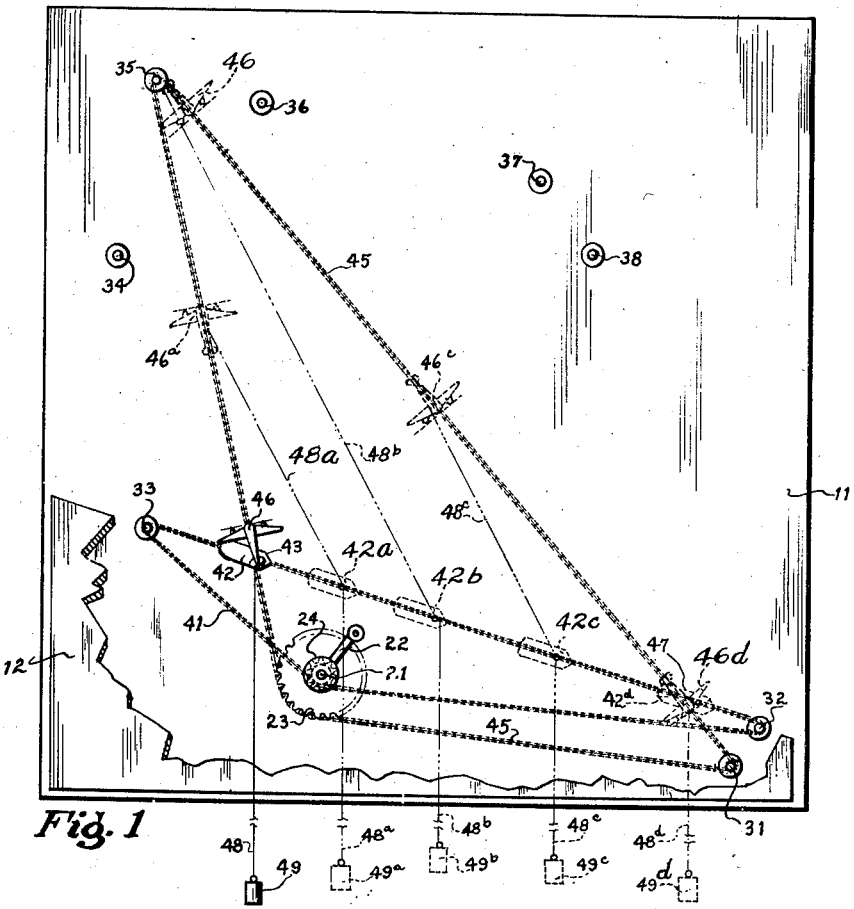
Fig. 1
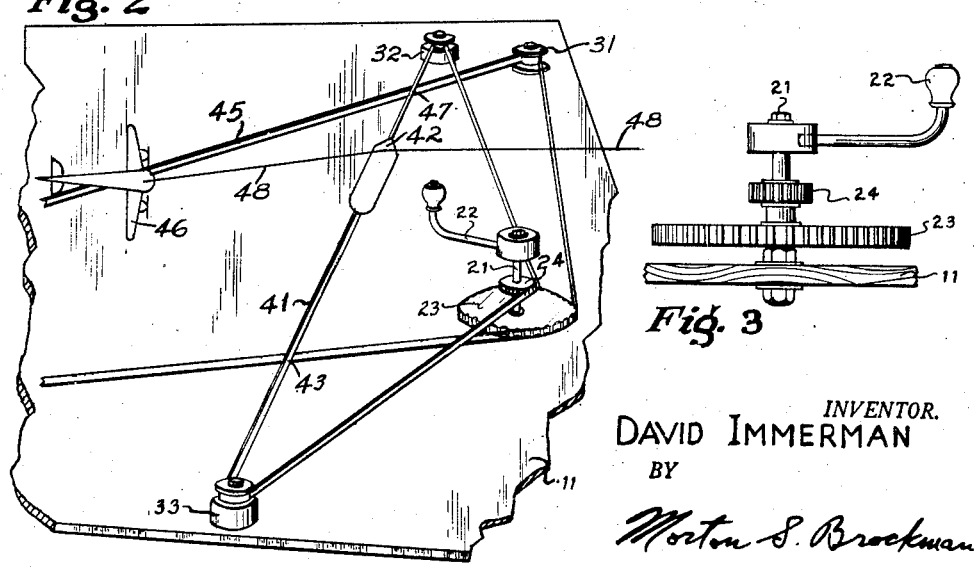
Fig. 2
Fig. 3
INVENTOR.
DAVID IMMERMAN
BY
Morton S. Brockman

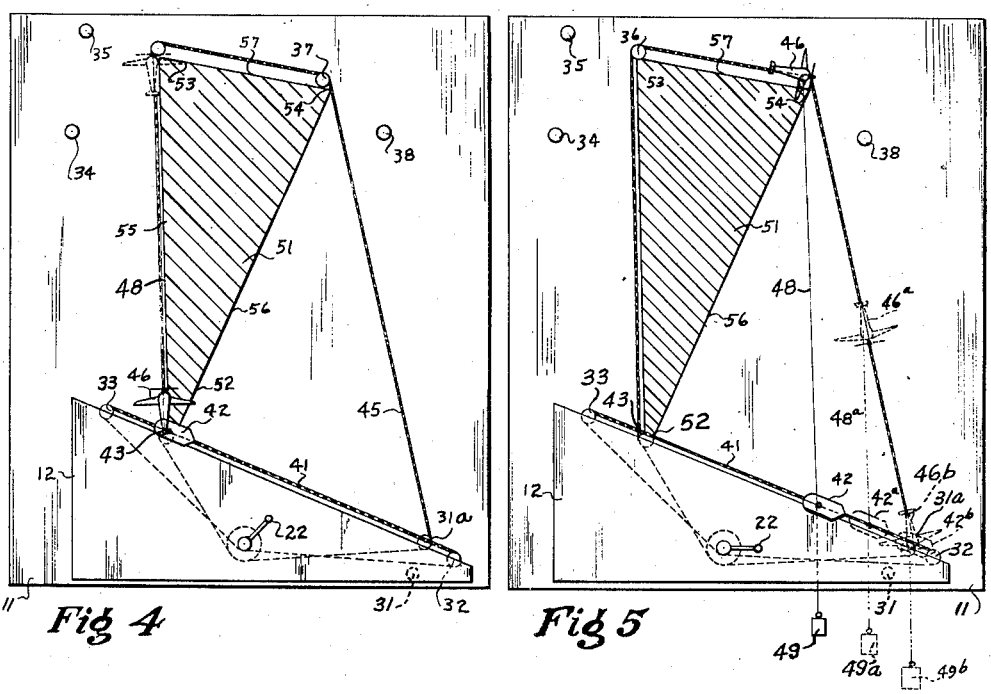

May 14, 1946. D. IMMERMAN 2,400,149
VISUAL AID DEVICE FOR RELATIVE MOVEMENT
Filed June 21, 1944 3 Sheets—Sheet 3

INVENTOR.
DAVID IMMERMAN
BY
Morton S. Brockman

Patented May 14, 1946

2,400,149

UNITED STATES PATENT OFFICE 2,400,149

VISUAL AID DEVICE FOR RELATIVE MOVEMENT

David Immerman, Cleveland Heights, Ohio

Application June 21, 1944, Serial No. 541,438

9 Claims. (Cl. 35—11)

This invention relates to nautical and aeronautical navigation and more particularly to apparatus used for illustrating sector searches and the relative movement of ships and planes.

For a better understanding of this invention, it may be well to point out that this device is displayed to a class or group of students studying navigation of the type mentioned and is operated by the instructor to clearly illustrate certain principles of this science. Heretofore, it has been the practice to illustrate the science of this type of navigation with a blackboard and chalk-talks or by means of slides or moving pictures. The success of the chalk-talks depended wholly upon the ability of the instructor to illustrate and for the students to envisage the actual relative movement of the respective ships. The second and third methods, when available, require a darkened room and the presentation of the subject often takes a much longer period of time than otherwise. Interruptions for timely questions are not conveniently possible. These latter methods also are almost impossible to use for individual instruction. As a result, the graphic instruction methods heretofore used to teach this particular science have made it very difficult to train classes or certain individuals rapidly and thoroughly.

It is therefore the primary object of this invention to provide a device which facilitates the teaching of relative movement in sector searches, nautical and aeronautical navigation and kindred subjects.

Another object of the invention is to provide for a more graphic and dramatic illustration of the relative movements of an airplane and a ship and which apparatus may be conveniently set up and which may be easily and quickly operated by either the instructor or a student.

Another object is to include in such apparatus a thread or cord which visually illustrates how and why the bearing or the relative position of the ship and plane are constant.

Still another object of this invention is to provide apparatus of the type mentioned which may be used for the purpose of demonstrating several different types of sector search problems.

These and other objects of the invention will become apparent from a reading of the following description and claims, together with the accompanying drawings, in which like parts are referred to and indicated by like reference characters, and wherein:

Figure 1 is a plan view of the apparatus with parts broken away to show its construction;

Figure 2 is an enlarged perspective view of the manual means used for operating the device;

Figure 3 is an enlarged elevation of a part of the operating means shown in Figure 2;

Figures 4 and 5 show the device assembled for demonstrating a second type of navigation problem.

Figure 6:
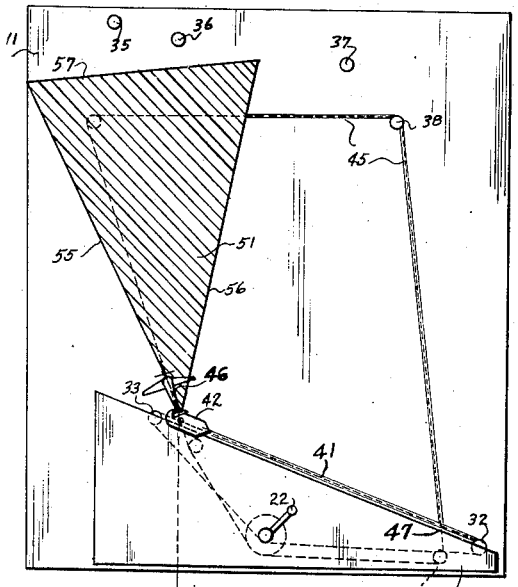
Figures 6 to 9 show the device set up for demonstrating a third type of navigation problem.

Referring to the drawings, there is shown in the Figure 1 the device set up to illustrate a simple problem known as the "out and in" scouting problem. The board or table member 11 is approximately forty inches square and is capable of being mounted on an easel or hung on a wall or blackboard. It has a flat top surface on which sets of idlers or wheels are mounted. The sprocket wheels are designated by the characters 23 and 24 and the idler wheels are indicated by the reference characters 31 to 38 inclusive. Near the bottom edge of the table member 11 there is mounted a short spindle 21 which supports the two sprockets 23 and 24 and which is rotatable by the hand crank 22. This operating assembly is clearly illustrated in the Figures 2 and 3. The two sprocket wheels 23 and 24 may have a tooth ratio of four or five to one to clearly illustrate the relative movement of the ship and plane, as hereinafter set forth.

A sprocket type chain, indicated and referred to as the first belt member 41, is mounted on the idlers or wheels 32 and 33 and is engaged by the sprocket wheel 24. A second sprocket chain, indicated and referred to as the second belt member 45, is mounted on the idlers or wheels 31 and 35 and is similarly engaged by the large sprocket wheel 23. Since both belt members encircle the one common spindle 21 and have fixed corner positions, they form two overlapping straight-sided geometric figures.

At a certain predetermined point on the first belt member 41, there is mounted a small nautical insignia which, in this case, is simply a ship or airplane carrer. Similarly mounted on the second belt member 45 there is an aeronautical insignia, namely, a plane.

The triangle formed by the belt member 41 is rather flat and extends somewhat laterally across the bottom portion of the table 11. A portion of the hypotenuse of this triangle which extends between the wheels 32 and 33 is normally visible and carries the ship insignia or marker 42. The upright triangle formed by the second belt member 45 on the wheels 23, 31 and 35 has its apex near the top of the board and the portions of two sides thereof carry the plane insignia or marker 46. The belt members 41 and 45 cross each other at the points indicated by the reference characters 43 and 47 of the drawings. The portion of the triangle or belt member 41 between these points represents or schematically indicates the path of a ship and the portion of the figure or second belt member 45 between the crossing points 43 and 47 which goes around the wheel 35 represents the course of an airplane. For the demonstration of the "out and in" scouting problem, the lengths of the portions of the two belt members between the crossing points should have the same ratio to each other that the circumferences of their respective sprocket wheels have to each other. This ratio is essential so that the ship and plane may coincide over the points 43 and 47 and which points represent the beginning and end of the demonstration courses. If, for example, the ratio of the sprockets 23 and 24 is a ratio of four to one, then the airplane insignia marker 46 will move four times as fast as the nautical insignia marker 42 and the length of the belt member 45 between the crossing points 43 and 47 should therefore be exactly four times as long as the length of the belt member 41 between the same crossing points.

A thread or cord 48 is attached to the plane marker 46 and passes through an eyelet or opening in the ship marker 42. The cord 48 is kept taut between the two markers by the small weight 49 which hangs below the table 11. An elastic cord having opposite ends attached to the markers may also be used to show the bearing of the objects. As the crank 22 is turned, the belt members 41 and 45 simultaneously move around their respective wheels and carry their respective markers along their predetermined courses.

For the demonstration of the first problem, the ship and plane start at the first crossing point 43 and as the crank 22 is turned clockwise, they assume respectively the positions indicated by the reference characters 42a, 42b and 42c and 46a, 46b and 46c of the Figure 1 until, at the end of the respective trips, the ship and plane meet at the crossing point 47 and as indicated by the characters 42d and 46d. During the demonstration, the cord 48 likewise assumes the positions indicated by the reference characters 48a, 48b and 48c. The ship and plane continue on their respective courses at their constant speeds with the bearing line 48a remaining taut and at its constant angle. When the ship and plane reach the positions shown by the marker characters 42b and 46b, the plane has reached its maximum distance from the ship and is ready to turn and return to it. The relative positions of the ship and plane indicated by the marker characters 42c and 46c show that the plane is on its return course and will intercept the ship at the predetermined location.

The particular point to be noted here and the specific principle that is desired to be taught to the class is that the general direction or bearing of the line 48 is constant, even though it may shift laterally during the demonstration. A pilot, therefore, thoroughly knowing and fully realizing that this bearing is constant, will feel more safe and secure during flight, even while far out of sight of the carrier ship or base, when he knows the direction and the constant speed of the ship and his plane. Since all these factors are easily predetermined, it is therefore a relatively simple matter for the pilot to return the plane to the ship at some different location.

The cover portion 12 is normally attached to or temporarily mounted on the table 11 to conceal the sprocket wheels 23 and 24 and the wheels 31, 32 and 33. However, it may be easily removed so that the operation of the apparatus may be made clearer to the students and the principles of relative movement more easily understood and visualized.

The Figures 4 and 5 show the device assembled and set up to demonstrate a geographic sector problem. The pulley 31 is remounted on the table 11 at the point indicated in the Figures 4 and 5 by the reference character 31a. The second belt member 45 is now mounted on the wheels 23, 31a, 36 and 37. The triangular templet 51 has been mounted on the table member 11 and indicates the general area to be covered by the plane or the area to be searched. The templet as here used and referred to is an arbitrary pattern or design of an area or sector to be searched or encompassed by a scouting plane based on a movable ship or carrier. The templet is movable and interchangeable in this device to simplify instruction and to facilitate the interchange of different problems capable of being illustrated or taught. The plane and ship separate and proceed on their respective courses. The plane covers the first leg of the course indicated by the side 55 of the templet. It turns and scouts the second or cross leg of the course, indicated by the side 57 of the templet. When the plane 46 reaches the second point of the sector indicated by the corner 54 of the templet and which coincides with the wheel 37, the plane is then ready to turn and return to the ship. When the plane marker 46 reaches the second point of its course and is ready to return to the ship, the demonstration bearing is taken by connecting the cord 48 with the ship marker 42 and plane marker 46, as indicated in the Figure 5. This bearing then becomes the constant bearing for the plane and ship to follow until interception takes place at the crossing point 47, as indicated by the reference characters 42b and 46b of the Figure 5.

The third sheet of the drawings illustrates still another type of problem which is known as "relative sector." In this problem the pilot is given a particular area to search, which predetermined sector thereof will move along with the ship. This sector, indicated by the triangular templet 51 of the Figures 6 to 9 inclusive, has its apex on the ship 42. The second belt member 45 is now mounted on the wheels 23, 31, 34 and 38. The first belt member 41 remains mounted on the wheels 24, 32 and 33, as before.

Figure 7:
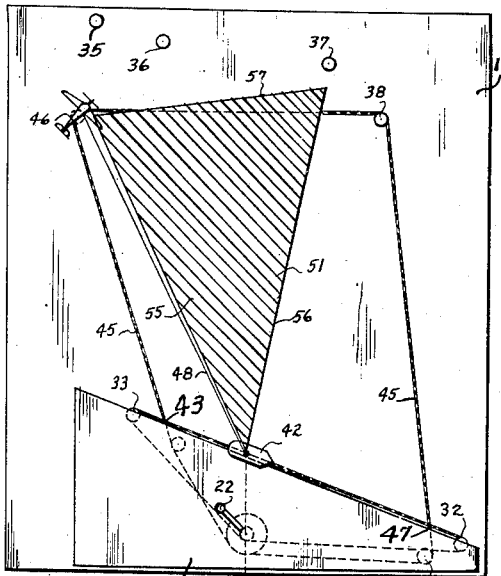
Figure 8:
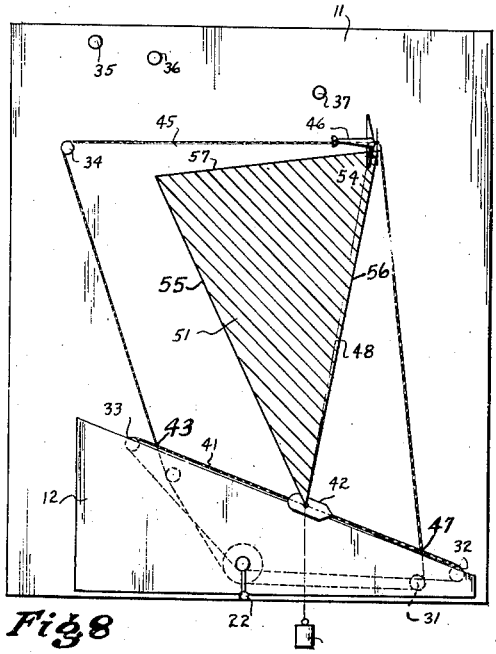
Figure 9:
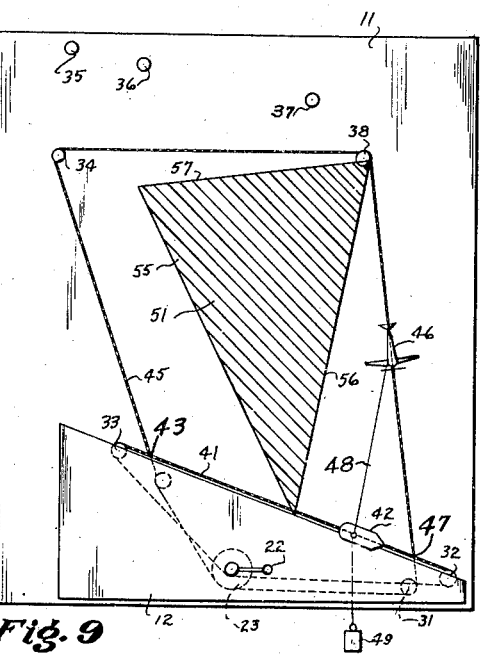

The Figure 6 shows the plane and ship about to separate and each to proceed on its respective predetermined course. The Figure 7 shows the plane marker 46 about to turn at the wheel 34 and proceed along a course maintaining the relative bearing indicated by the side 57 of the templet 51. The bearing cord 48 coincides with the left side 55 of the templet 51 at this point. When the plane marker 46 reaches the point indicated by the wheel 38, the corner 54 of the templet 51 coincides therewith and the plane is then ready to return to the ship. The sector moves along with the ship and the bearing cord 48 coincides with the third or right side 56 of the templet 51. The sector represented by the templet then becomes stationary, the interception bearing is then taken, and the plane and ship proceed at constant rates of speed in the manner set forth in the explanation of Figure 5.

Having thus disclosed the invention, it should be understood that the protection afforded by this patent is not to be limited or restricted to the particular embodiment of the apparatus specifically described and illustrated. It should be clearly understood that there may be other forms or modifications of this device which may also be covered by and which may also be fairly considered to come within the scope of the appended claims.

I claim:

1. A visual aid device for illustrating the principles of relative movement, comprising in combination, a table member, two proportioned belt members mounted on the table member and being capable of moving over individual predetermined courses, each of the belt members having a marker thereon, a pair of proportioned drive means for simultaneously moving the belt members at different predetermined respective speeds mounted on the table member, and a cord member having one end thereof attached to one of the markers and including a taut portion connected to the other marker, said belt members and drive means being assembled in a manner whereby the bearing of the cord member will be constant while the said markers are moving at different rates of speed and in different directions.

2. A visual aid device for illustrating the principles of relative movement, comprising in combination, a table member, two proportioned belt members mounted on the table member and being capable of moving over individual predetermined courses, each of the belt members having a marker thereon, the said courses crossing each other at least at two points, a pair of proportioned sprockets for simultaneously moving the belt members at different predetermined respective speeds mounted on the table member, and a taut line member having ends thereof attached to each of the said markers, the said belt members and sprockets being assembled in a manner whereby the bearing of the line member will be constant while the said markers are moving at different rates of speed and in different directions.

3. A visual aid device for illustrating the principles of relative movement, comprising in combination, a table member, long and short belt members mounted on the table member and being capable of moving over individual predetermined courses, one of the said courses representing the path of a ship, the other of the courses representing the path of an airplane and each of the courses crossing each other at representative points where the ship and plane leave and meet each other, each of the belt members having a characteristic marker thereon representing a ship and an airplane respectively, a large and small sprocket means for simultaneously moving the belt members at different predetermined speeds mounted on the table member, and a taut line member having ends thereof attached to each of the said markers, the said large sprocket engaging the long belt member and the small sprocket engaging the short belt member in a manner whereby the bearing of the line member will be constant while the said markers are moving at different rates of speed and in different directions.

4. A device of the type defined in claim No. 3 and further characterized by the said table member having a pattern thereon representing the sector encompassed by the airplane.

5. A visual aid device for illustrating the principles of relative movement, comprising in combination, a table member, a first set of spaced wheels including a large sprocket wheel and having a long belt member therearound mounted on the table member, a second set of spaced wheels including a small sprocket wheel and having a short belt member therearound mounted on the table member, each of the belt members having a marker thereon, a means for simultaneously rotating both of the sprocket wheels and for simultaneously moving the belt members on the said wheels at different predetermined speeds and a taut line member having ends thereof attached to each of the said markers, the said large sprocket moving the long belt member and the small sprocket moving the short belt member in a manner whereby the bearing of the line member will be constant while the said markers are moving at different rates of speed and in different directions.

6. A visual aid device for illustrating the principles of relative movement, comprising in combination, a table member, a first set of spaced wheels including a small sprocket wheel and having a short belt member therearound representing the path of a ship mounted on the table member, a second set of spaced wheels including a large sprocket wheel and having a long belt member therearound representing the course of an airplane mounted on the table member, each of the said belt members having characteristic markers thereon, the said path and course crossing each other at representative points where the ship and plane leave and meet each other, a means for simultaneously rotating both of the sprocket wheels and simultaneously moving the belt members on the said wheels at different predetermined speeds, and a taut line member having one end thereof attached to one of the markers and its opposite end connected to the other marker, the said small sprocket moving the short belt member and the large sprocket moving the long belt member in a manner whereby the bearing of the cord member will be constant while the said markers are moving at different rates of speed and in different directions.

7. A visual aid device for illustrating the principles of relative movement, comprising in combination, a table member, a first set of spaced wheels including a small sprocket wheel and having a short belt member therearound representing the path of a ship mounted on the table member, a second set of spaced wheels including a large sprocket wheel and having a long belt member therearound representing the course of an airplane mounted on the table member, the short belt member having nautical insignia at a certain point thereon, the second belt member having aeronautical insignia at a certain point thereon, the said path and course of the ship and plane represented by the insignia crossing each other at two representative points where the ship and plane meet or leave each other, a means for simultaneously rotating the sprocket wheels, and a taut line member having ends thereof attached to each of the said insignia, the said small wheel moving the short belt member and the large wheel moving the long belt member in a manner whereby the bearing of the line member will be constant while the said markers are moving at relatively different rates of speed and in different directions.

8. A visual aid device for illustrating the principles of relative movement, comprising in combination, a table member, a first set of spaced wheels including a small sprocket wheel and having a short belt member therearound representing the path of a ship mounted on the table member, a second set of spaced wheels including a large sprocket wheel and having a long belt member therearound representing the course of an airplane mounted on the table member, the first belt member having nautical insignia at a certain point thereon, the second belt member having aeronautical insignia at a certain point thereon, the said path and course of the ship and plane represented by the said insignia crossing each other at two points where the insignia representing the ship and plane meet or leave each other, a drive means connected to both of the sprocket wheels simultaneously moving the two belt members on the said wheels at different predetermined speeds, and a taut line member having one end thereof attached to the aeronautical insignia and the opposite end connected to the nautical insignia, the said small wheel moving the short belt member and the large wheel moving the long belt member in a manner whereby the bearing of the cord member will be constant while the said insignia are moving at different rates of speed and in different directions.

9. A visual aid device for illustrating the principles of relative movement, comprising in combination, a table member, a first set of spaced wheels including a small sprocket wheel, a second set of spaced wheels including a large sprocket wheel, the said sprocket wheels being mounted on the same spindle and having a predetermined tooth ratio, a short belt member mounted on the first set of spaced wheels and engaged by the small sprocket wheel, the said short belt member representing the path of a ship and having at a certain point thereon nautical insignia, a long belt member mounted on the second set of spaced wheels and engaged by the large sprocket wheel, the said long belt member representing the course of an airplane and having at a certain point thereon aeronautical insignia, the said belt members having lengths commensurate with the tooth ratio of the respective sprockets engaged therewith, and a taut line member having one end thereof attached to the aeronautical insignia and the opposite end thereof to the nautical insignia, the bearing of the line member being constant while the said insignia are being moved at different rates of speed and in different directions by their respective belt members.

DAVID IMMERMAN.